United States Patent
Paul et al.

(12)

(10) Patent No.: US 6,190,446 B1
(45) Date of Patent: Feb. 20, 2001

(54) COMPOSITION FOR SPLICING PHOTOGRAPHIC FILMS

(75) Inventors: Swaraj Paul; Ann-Christin Paul, both of Spånga (SE)

(73) Assignee: Eastman Kodak Company, Rochester, NY (US)

( * ) Notice: Under 35 U.S.C. 154(b), the term of this patent shall be extended for 0 days.

(21) Appl. No.: 09/250,201

(22) Filed: Feb. 16, 1999

(30) Foreign Application Priority Data

Mar. 12, 1998 (FR) .................................................. 98 03272

(51) Int. Cl.[7] .................................................. C09J 101/18
(52) U.S. Cl. .......................................................... 106/169.43
(58) Field of Search ........................................ 106/169.43

(56) References Cited

U.S. PATENT DOCUMENTS

| 1,987,570 | * | 1/1935 | Bruson ................................... 134/79 |
| 2,037,053 | | 4/1936 | Snyder et al. . |
| 2,169,199 | * | 8/1939 | Thomas ..................................... 91/68 |
| 2,296,891 | | 9/1942 | Andersen . |
| 2,510,166 | * | 6/1950 | Baruch et al. ........................ 106/185 |
| 2,895,844 | | 7/1959 | Bader et al. . |
| 4,483,714 | * | 11/1984 | Yamaue et al. ....................... 106/279 |

FOREIGN PATENT DOCUMENTS

| 1 352 605 | 5/1974 | (GB) . |
| 1527596 | 10/1978 | (GB) . |

* cited by examiner

*Primary Examiner*—David Brunsman
(74) *Attorney, Agent, or Firm*—Andrew J. Anderson

(57) ABSTRACT

A glue for splicing photographic films that comprises:
0.5 to 4% nitrocellulose,
5 to 25% of alkanol,
5 to 20% lower alkyl acetate,
20 to 80% ketone, and
4 to 15% alkoxyalcohol.

16 Claims, No Drawings

COMPOSITION FOR SPLICING PHOTOGRAPHIC FILMS

FIELD OF THE INVENTION

The present invention relates to a new composition intended for splicing photographic films, and especially for splicing films having a cellulose triacetate support.

BACKGROUND OF THE INVENTION

In cinematography, it is common practice to join film sections by splicing. During cinematographic shooting a series of scenes is filmed onto the same negative film. From this negative film, a positive film is printed that allows these various scenes to be viewed and those that will make up the final cinematographic work to be selected. When this selection has been made, the final version of the cinematographic work is produced by cutting and splicing together the negative film according to the selected scenes.

In the first place, the negative film is cut. This cut can be done using a straight cutter which at the same time removes the emulsion layers from the part of the film to be spliced. It can also be done using a chamfer cutter, which chamfers the ends of the films to be spliced in a complementary way. Then this part of the film is glued, and this glued part is assembled with the end of the film to be spliced by maintaining pressure until the films are finally spliced. To increase the speed of splicing, a splicing technique called "hot splicing" consists in carrying out the splice at temperatures that can reach 50° C.

This splicing is especially tricky to use because the negative film resulting from the splicing of the film parts is the base film that will be used to produce copies for projection on a film screen. Thus the splices must be solid to withstand the mechanical stresses that the film is subjected to when printing the copies. Further these splices must withstand cleaning of the film in solvents. After splicing the film, it is essential to remove the traces of the glue remaining on the film. Finally, these splices must not be photographically visible because they would be reproduced on the copies obtained from this film.

Glues containing nitrocellulose in solution in a mixture of organic solvents are known for splicing photographic films. These glues contain solvents of the dioxane and/or dichloromethane or dichloroethane type in substantial quantities. For safety and environmental reasons, it is desirable to use glues that do not contain these organic solvents; in particular in the hot treatment processes that help these solvents to evaporate. It is particularly desirable to have a glue that does not contain dioxane.

SUMMARY OF THE INVENTION

The present invention provides a glue for splicing photographic films that comprises:
0.5 to 4% nitrocellulose,
5 to 25% of alkanol
5 to 20% lower alkyl acetate,
20 to 80% ketone, and
4 to 15% alkoxyalcohol.

In the scope of the invention, lower alkyl means alkyl groups containing 1 to 4 carbon atoms.

The invention also relates to a process a first and a second photographic films, each film comprising a support and a silver halide emulsion layer, process that comprises:

(a) removing the emulsion layer from an end of the first film, (b) applying a glue as defined in claim 1 to said end, and (c) contacting said end with the end of the second film for slicing the films.

Another process of the invention relates to a process for splicing a first and a second photographic films, each film comprising a support and a silver halide emulsion layer, process that comprises:

(a) chamfering the end of the first and the second films so that the end of one film is complementary to the end of the other film removing the emulsion layer from an end of the first film, (b) applying a glue as defined in claim 1 to said end, and (c) contacting said end with the end of the second film for slicing the films.

This glue is particularly efficient for cold splicing of photographic films comprising cellulose triacetate support.

DETAILED DESCRIPTION OF THE INVENTION

According to an embodiment of the invention, alkanol is preferably a lower alkanol comprising 1 to 4 carbon atoms.

According to a preferred embodiment, the glue comprises at least one lower alkanol selected from among methanol, ethanol, propanol, alone or in combination.

According to a particular embodiment, the glue of the invention comprises in combination of methanol and ethanol, ethanol being less than 10% by weight of the combination of methanol and ethanol.

The lower alkyl acetate useful in the invention can be ethyl acetate, butyl acetate, and propyl acetate, preferably butyl acetate, alone or in combination.

The alkoxy alcohol useful in the glue of the invention is preferably ethylene glycol monoalkylether such as ethylene glycol monopropylether.

The ketone of the present invention can be acetone, or methylethylketone, preferably acetone.

According to preferred embodiments, the glue consists essentially of from 0.5 to 4% nitrocellulose, 5 to 25% of alkanol, 5 to 20% lower alkyl acetate, 40 to 80% ketone, and 4 to 15% alkoxyalcohol.

According to one particular embodiment, the glue comprises 0.5 to 2% nitrocellulose, 5 to 20% alkanol, 10 to 20% lower alkyl acetate, 60 to 70% acetone and 4 to 15% ethylene glycol monopropylether.

According to another particular embodiment, the glue comprises 1.5 to 1.8% nitrocellulose, 6 to 10% methanol, 0.2 to 1% ethanol, 15 to 20% butyl acetate, 60 to 70% acetone, and 8 to 12% ethylene glycol monopropylether.

The splicing process of the invention can be used with photographic films cut with a straight cutter, for example a Hamman straight cutter or a Bell Howell straight cutter.

The splicing process of the invention can be carried out from photographic films having chamfering ends, for example with a Hamman chamfer cutter.

The glue of the present invention is useful for splicing color or black and white photographic films comprising light sensitive silver halide grains. Such film can be Eastman Color Positive® film, Eastman Color Negative® film, Eastman Color Intermediate® film, reversal films, Kodachrome® films, or Ektachrome® films. The glue of the present invention is especially useful for splicing motion picture films.

The glue of the present invention is particularly efficient for splicing photographic films whose support is cellulose triacetate.

The present invention is described in more detail in the following examples.

EXAMPLES

Example 1

Solution A was prepared comprising a mixture of solvent having the following composition (percentages by weight):

| | |
|---|---|
| Methanol | 8.55% |
| Acetone | 64.44% |
| n-Butyl acetate | 17.10% |
| Ethylene glycol monopropylether | 9.91% |
| Ethanol | 0.40 % |

A nitrocellulose solution B was prepared in the mixture of solvents A described above. This solution B contained 20% nitrocellulose CA4 A60 marketed by Bergerac NC (weight average molecular weight Mw=136.1, number average molecular weight Mn=54.3, molecular weight distribution= 2.5).

Then solutions A and B were mixed in the following proportions (% weight):

Solution A: 93.4%

Solution B: 6.6%

Thus a glue was obtained having the following composition:

1.3% nitrocellulose,
8.4% methanol,
0.4% ethanol,
16.8% butyl acetate,
63.3% acetone,
9.70% ethylene glycol monopropylether At 20° C. this glue had a viscosity of 200 sec. measured with a Ubbelodhe type capillary viscometer. It contained 1.3% by weight solid matter.

Example 2

In this example a 35 mm Kodak 5293 ECN Vision 200T® film was cut with a Hamman® straight cutter that removed at the same time the emulsion layers from the film. The glue of Example 1 was applied to the end thus prepared, then the end coated with the glue is contacted with the support of the film to be assembled with in a Bell Howell heating press, maintained at 30° C., until the final splice was obtained. Then the strength of the splice was measured with a DY 30 Tension and Compression machine manufactured by ADAMEL LHOMARGY by applying a tensile force to the spliced films until the splice broke.

This experiment was carried out 40 times. The average breaking strength was 22.9 daN/film width.

Example 3

In this example, a 35 mm Kodak 5293 ECN Vision 200T® film was cut with a Hamman® chamfer cutter. Then the glue of Example 1 was applied to the chamfered end thus prepared, and then the end coated with the glue is contacted with the chamfered end of the film to be assembled with, in a CTM cold press (20° C.) until the final splice was obtained. The strength of the splice was measured in the conditions described in Example 2.

This experiment was carried out 40 times. The average breaking strength was 32.7 daN/film width.

By carrying out the same experiment with the glue, Kodak Professional Film Cement® that is currently marketed and contains 58% dioxane, an average breaking strength of 29.7 daN/film width was obtained.

Example 4

In this example a 16 mm Kodak 7293 ECN Vision 200T® film was cut with a Hamman® chamfer cutter. Then the glue was applied to the end thus prepared, and then the coated end is contacted and the film to be assembled with were placed in a CTM cold press (20° C.) until the final splice was obtained. The strength of the splice was measured in the conditions described in Example 2.

This experiment was carried out 40 times. The average breaking strength was 12.3 daN/film width.

By carrying out the same experiment with the glue, Kodak Professional Film Cement® that is currently marketed and contains dioxane, an average breaking strength of 10.9 daN/film width was obtained.

We claim:

1. A glue for splicing photographic films that comprises:
0.5 to 4% nitrocellulose,
5 to 25% of alkanol
5 to 20% lower alkyl acetate,
20 to 80% ketone, and
4 to 15% alkoxyalcohol.

2. The glue according to claim 1 wherein the alkanol is lower alkanol.

3. The glue according to claim 2 wherein the alkanol is selected from methanol, ethanol, propanol or a combination of these alcohols.

4. The glue according to claim 3 wherein the alkanol is a combination of methanol and ethanol in which ethanol represents less than 10% by weight of methanol and ethanol combination.

5. The glue according to claim 1 wherein the lower alkyl acetate is selected from among ethyl acetate, N-butyl acetate, or propyl acetate.

6. The glue according to claim 1 wherein the alkoxy alcohol is the ethylene glycol monoalkylether.

7. The glue according to claim 6 wherein the ethylene glycol monoalkylether is the ethylene glycol monopropylether.

8. The glue according to claim 7 that comprises:
1.3% nitrocellulose,
8.4% methanol,
0.4% ethanol,
16.8% butyl acetate,
63.3% acetone, and
9.70% ethylene glycol monopropylether.

9. The glue according to claim 1 that comprises,
0.5 to 2% nitrocellulose,
5 to 20% alkanol,
10 to 20% butyl acetate,
60 to 70% acetone, and
4 to 15% ethylene glycol monopropylether.

10. The glue according to claim 9 that comprises:
1.5 to 1.8% nitrocellulose,
6 to 10% methanol,
0.2 to 1% ethanol,
15 to 20% butyl acetate,
60 to 70% acetone, and
8 to 12% ethylene glycol monopropylether.

11. The glue according to claim 1 that consists essentially of:

0.5 to 4% nitrocellulose,
5 to 25% of alkanol
5 to 20% lower alkyl acetate,
40 to 80% ketone, and
4 to 15% alkoxyalcohol.

12. A process for splicing a first and a second photographic films, each film comprising a support and a silver halide emulsion layer, comprising:

(a) removing the emulsion layer from an end of the first film, (b) applying a glue as defined in claim 1 to said end, and (c) contacting said end with the end of the second film for splicing the films.

13. The process according to claim 12 wherein the support of the photographic film is cellulose triacetate.

14. A process for splicing a first and a second photographic films, each film comprising a support and a silver halide emulsion layer, comprising:

(a) chamfering the end of the first and the second films so that the end of one film is complementary to the end of the other film removing the emulsion layer from an end of the first film, (b) applying a glue as defined in claim 1 to said end, and (c) contacting said end with the end of the second film for splicing the films.

15. The process according to claim 14 wherein the support of the photographic film is cellulose triacetate.

16. A composite film comprising at least two cellulose triacetate film segments spliced with a glue as defined in claim 1.

* * * * *